Dec. 4, 1962   F. B. RYKOSKEY   3,067,385
OIL MONITOR
Filed Aug. 24, 1959   4 Sheets-Sheet 1

INVENTOR
FRANCIS B. RYKOSKEY
BY
ATTORNEYS

Dec. 4, 1962  F. B. RYKOSKEY  3,067,385
OIL MONITOR

Filed Aug. 24, 1959  4 Sheets-Sheet 3

INVENTOR
FRANCIS B.
RYKOSKEY

BY Diggins & LeBlanc
ATTORNEYS

United States Patent Office 3,067,385
Patented Dec. 4, 1962

3,067,385
OIL MONITOR
Francis B. Rykoskey, 708 Baltimore & Ohio Bldg.,
Baltimore 1, Md.
Filed Aug. 24, 1959, Ser. No. 835,588
14 Claims. (Cl. 324—61)

This invention relates to a capacitive type control circuit for determining the content of foreign material in a dielectric liquid and more particularly is concerned with a temperature compensated capacitive type detector for monitoring the foreign material content of a lubricating oil.

Capacitive type detectors for determining the amount of foreign material present in a dielectric liquid such as oil or the like are well known. These detectors are usually based upon a change in capacity between two parallel capacitive plates occasioned by the change in dielectric constant of the liquid between the plates brought about by the different dielectric constant of the foreign material in the liquid. Since the dielectric constant of a foreign material such as dust or water which might gain access to a lubricator oil is substantially different from the oil the overall dielectric constant between a pair of capacitor plates changes in accordance with the amount of foreign material present. This change in dielectric constant may be displayed on a suitable meter to give an indication of the amount of dust or water present in an oil.

It has been found, however, that the dielectric constant of liquid and particularly of lubricating oil changes substantially with temperature. The dielectric constant of most lubricating oils has a maximum value around 100 degrees F. and falls off rapidly when the temperature of the oil varies any appreciable amount from this value. For example, the dielectric constant and hence, the capacitance between parallel capacitor plates has been found to fall off approximately to one-fourth its initial value in going from 100 to 200 degrees F. This substantial change in dielectric constant with the temperature of the oil makes it imperative that some form of temperature compensation be employed in order to obtain an accurate reading as to the amount of foreign matter present in a lubricating oil at any particular instant. While various temperature compensating arrangements have been employed all suffer from the disadvantage that they incorporate at least one secondary or auxiliary variable capacitor which is ordinarily calibrated to compensate for changes in temperature. The introduction of a second capacitor of necessity substantially reduced the sensitivity of the measuring device and introduces additional errors which tend to effect the readings and substantially reduce the accuracy of the instrument.

The present invention provides a novel temperature compensated capacitive type detector which avoids the above mentioned difficulties involving an auxiliary capacitor wherein the single measuring capacitor itself is varied in accordance with the change in temperature of the oil in order to give the same capacitance reading for all changes in oil temperature over the operating range of a conventional lubricating oil. Also provided is a novel variable capacitor which may be temperature compensated through the suitable actuation of a movable plate constituting a portion of the capacitor.

It is therefore a primary object of the present invention to provide an improved dielectric liquid monitoring device.

Another object of the present invention is to provide an improved variable capacitor.

Another object of the present invention is to provide an improved temperature compensated capacitor for measuring the dielectric constant of liquids.

Another object of the present invention is to provide temperature compensating means for a capacitive type oil monitoring device.

These and other objects and advantages of the invention will be more apparent upon reference to the following specification, claims and appended drawings wherein:

Figure 1:
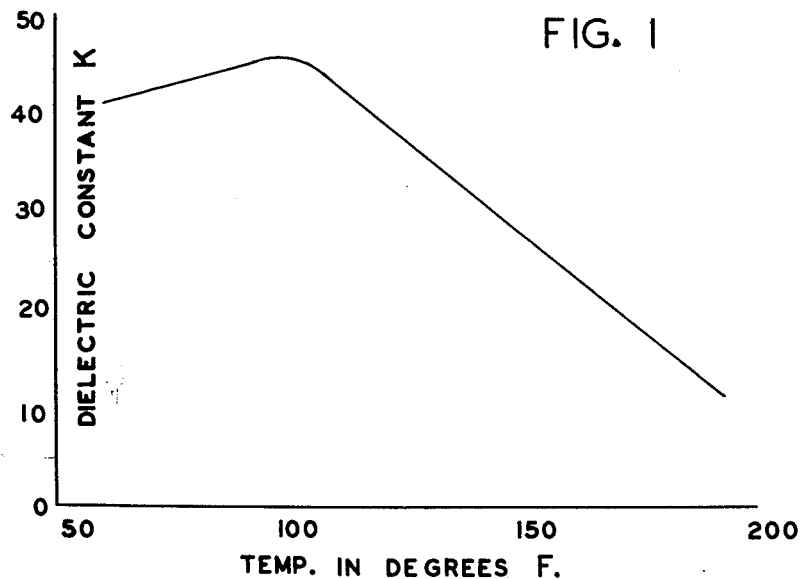
FIGURE 1 is a plot of the dielectric constant temperature of a typical lubricating oil used in conjunction with the present invention.

Referring to the drawings, FIGURE 1 is a plot showing the variation in dielectric constant K of a standard commercially available lubricating oil presently used in diesel locomotives plotted as a function of temperature in degrees F. As can be seen from FIGURE 1 the dielectrical constant K of the lubricating oil gradually increases after the oil warms up so as to reach a maximum near 100 degrees F. As the temperature of the oil increases beyond 100 degrees the value of the dielectric constant falls off quite rapidly so that when the temperature of the oil reaches approximately 200 degrees F., the dielectric constant K is approximately ¼ its value at 100 degrees F. This represents a change in dielectric constant and a resulting change in capacitance between parallel plates of a conventional capacitor of approximately 400% for changes in temperature from 100 and 200 degrees F.

Figure 2:
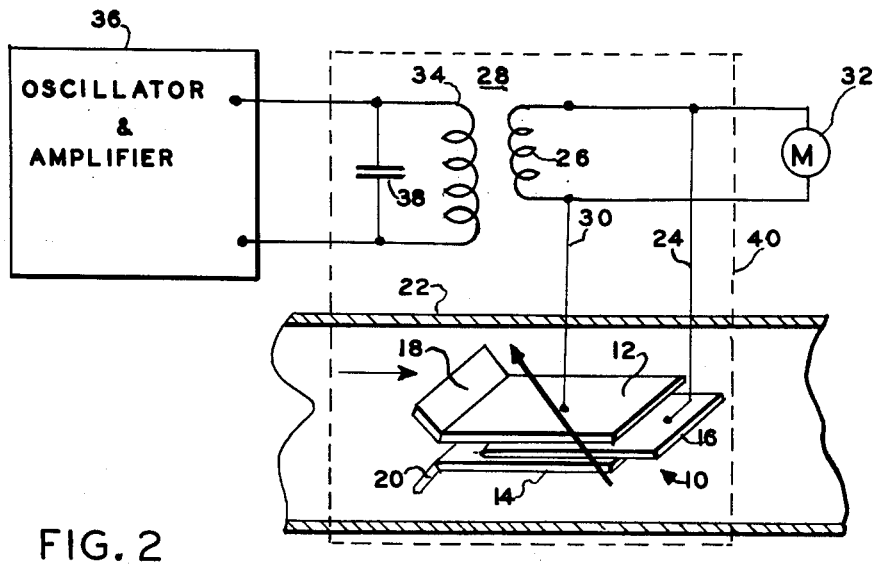
FIGURE 2 is a partially schematic diagram of the novel oil monitoring device of the present invention illustrating the movable capacitor plates of the electrical measuring circuit.

FIGURE 2 shows in schematic form the electrical circuit connections for the monitor of the present invention and illustrates a variable capacitor generally indicated at 10 comprising movable parallel outer plates 12 and 14 between which is sandwiched a stationary plate 16. Intermediate plate 16 is spaced slightly from plates 12 and 14 so that the intermediate plate forms one side of a capacitor whereas plates 12 and 14 form the opposite side of the same variable capacitor. These latter plates include upturned ends 18 and 20 which help to direct a portion of the oil flowing through a conduit 22 in the direction of the arrow in FIGURE 2 between the plates of the capacitor 10. Intermediate plate 16 is connected by means of a suitable lead 24 to one side of the secondary winding 26 of a tuned transformer 28 while outside plates 12 and 14 are connected together and to the opposite side of the secondary winding 26 by means of a second suitable lead 30. Winding 26 in conjunction with capacitor 10 forms a tuned circuit in the secondary of the transformer 28 and is connected to a suitable meter 32 which, for example, may be a conventional vacuum tube volt meter.

Alternating current is supplied to the primary winding 34 of transformer 28 from a conventional A.C. generator comprising an oscillator and amplifier circuit generally indicated in block form at 36. The tuned primary of transformer 28 includes a capacitor 38 connected across the primary winding 34.

The particular source of electrical energy as well as the particular measuring circuit are both conventional and therefore are indicated broadly by the elements 32 and 36. The principal portion of the monitoring circuit of the present invention includes the tuned transformer and particularly the variable capacitor 10 which elements are enclosed by the dotted line 40 indicating that they form the major novel portions of the present invention.

Figure 3:
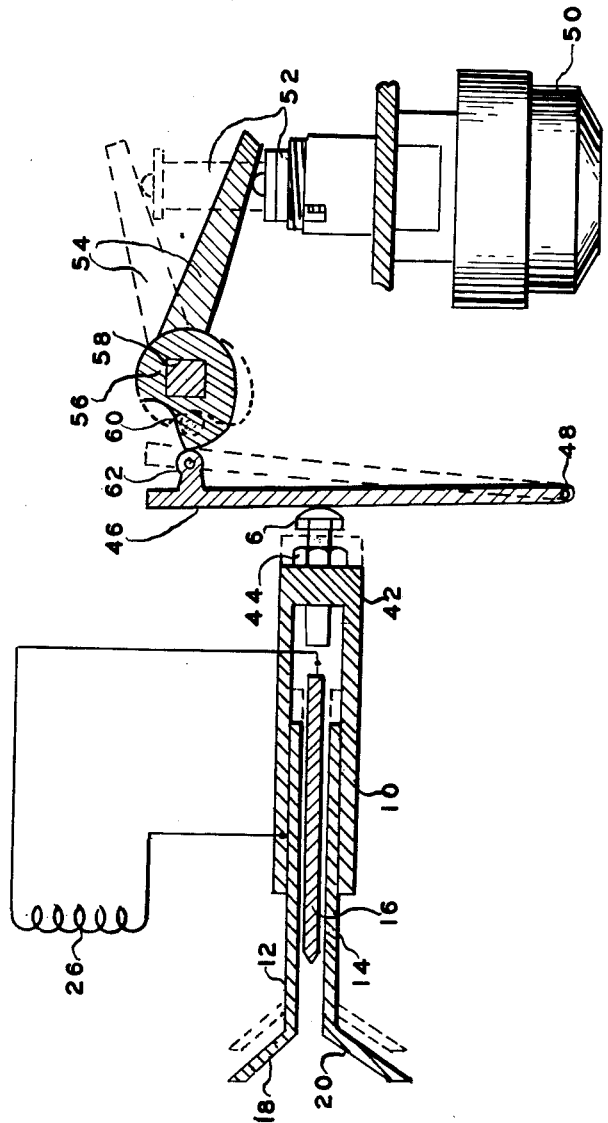
FIGURE 3 shows in more detail the movable capacitor plates of the monitoring device of the present invention and their actuation in response to changes in temperature.

FIGURE 3 illustrates the mechanical actuation of the variable capacitor 10, the relative positions of the elements at lower temperatures being indicated in solid lines and movement into the position assumed by the elements at a higher operating temperature is indicated by the dotted lines in FIGURE 3.

Capacitor 10 comprises a capacitor frame 42 rigidly secured to the outer movable plates 12 and 14. Frame 42 is provided at the downstream end of capacitor 10 with a bolt having a head 44 upon which bears driving lever 46 pivoted at 48 to move the frame and rigidly affixed plates 12 and 14 longitudinally with respect to intermediate stationary plate 16.

A temperature sensitive cartridge 50 including a piston 52 movable in response to variations in oil temperature drives a cam arm 54 to rotate a cam 56 about a shaft having a rectangular cross-section as indicated at 58. Cam 56 includes a camming surface 60 which bears against a roller 62 carried near the upper end of lever 56 to transform movement of piston 52 of the thermosensitive cartridge 50 into suitable translational motion of condenser plates 12 and 14.

Temperature sensing elements of the type indicated at 50 are commercially available and very often comprise a hermetically sealed cartridge filled with powdered copper, which expands sufficiently to actuate a slidable arm or plunger element 52. The powdered copper is conventionally intermixed with paraffin for lubrication of the copper which expands when heated and contracts when cooled. Although a cartridge of this type is the preferred temperature sensing element, it is apparent that other temperature sensitive means may be employed with equal facility for example, lever arm 54 may be driven by a bi-metallic strip if so desired.

Figure 4:
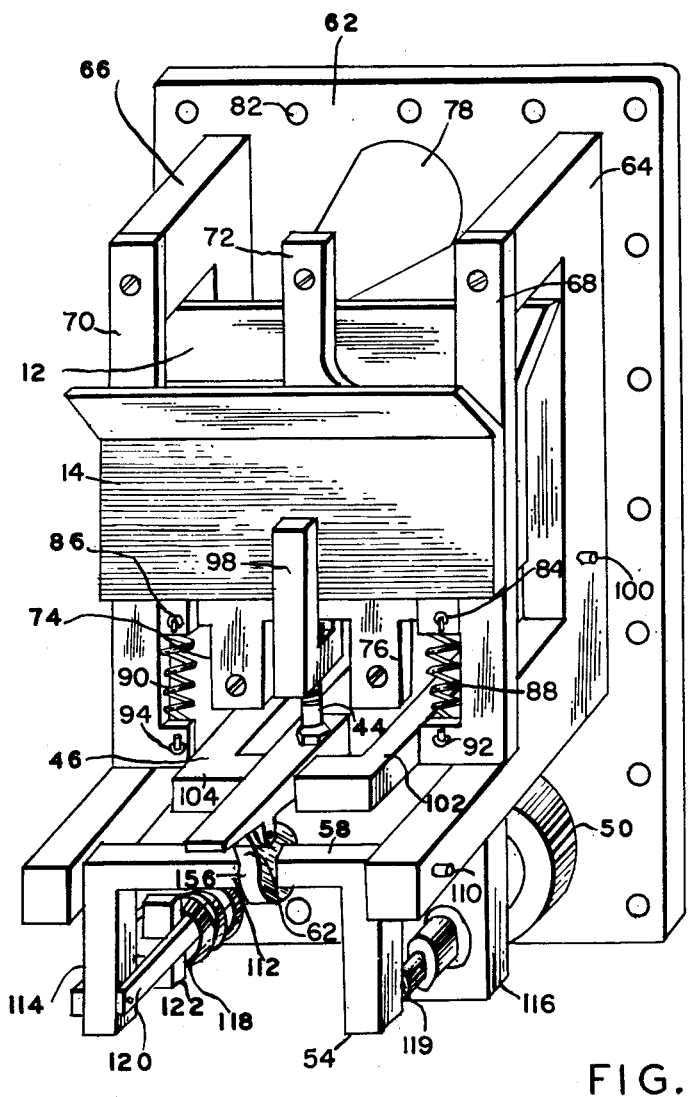
FIGURE 4 shows the variable capacitor of the present invention on a mounting board suitable for attachment in a lubricating oil line.
Figure 5:
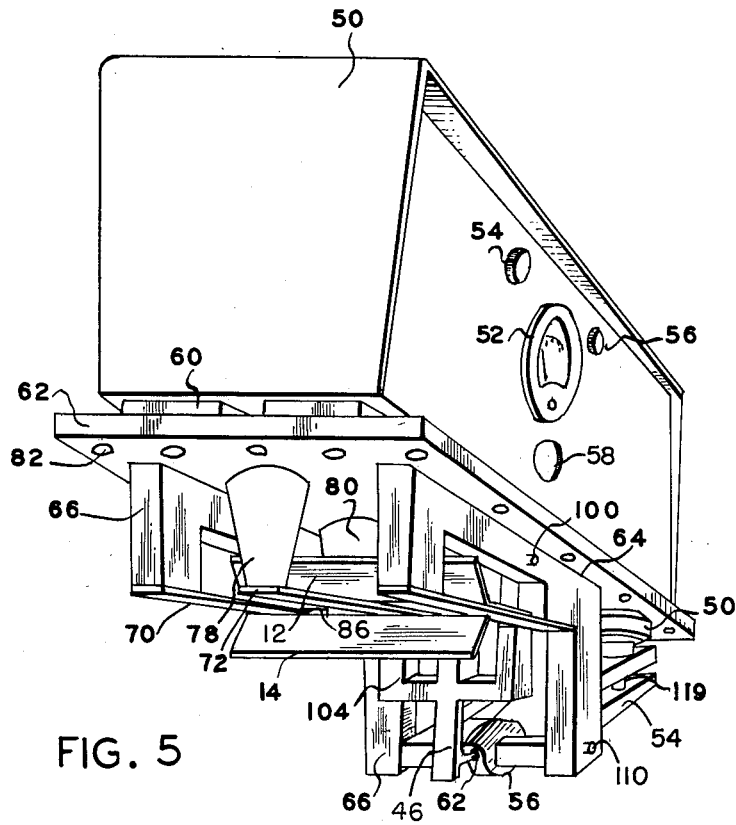
FIGURE 5 is a perspective view of the entire monitoring device of the present invention ready for connection to the flow line of an oil filter line.

FIGURES 4 and 5 show in detail the various features of capacitor 10 in connection with its mounting on the bottom of suitable electronic apparatus prior to its insertion into the lubrication line of a diesel locomotive. It will be understood, that only the variable capacitance portion, that is, the portion shown in FIGURE 4 actually extends into the flow line and is submerged in the liquid. The unit includes a suitable cabinet 50 housing the electrical apparatus making up oscillator-amplifier 36, transformer 28 and meter 32 along with the associated leads shown in FIGURE 2 of the drawing. The indicating face of the meter 32 is illustrated at 52 in FIGURE 5. Aperture 54 is provided in cabinet 50 for a conventional on-light to show that the apparatus is energized and a second aperture 56 is provided to house a danger signal light. Below and spaced from the indicating face 52 of the meter is a still further aperture 58 providing a window for determining the zero adjustment of the meter. The above elements are all of conventional design.

Spaced from the bottom of cabinet 50 by a plurality of heat insulating legs 60 is a mounting board or panel 62 to which the variable capacitor 10 is attached. Insulating legs 60 are preferably four in number and may be made of any suitable heat insulating material.

Secured to panel 62 are a pair of spaced parallel support frames 64 and 66, on which are mounted a pair of slide bars 68 and 70 as best seen in FIGURE 4. Outer movable plates 12 and 14 rest on the opposite flat surfaces of slide bars 68 and 70 and move along these surfaces under the influence of cam 56.

Sandwiched between plates 12 and 14 is intermediate plate 16 of generally rectangular configuration. The lower end showing the substantial width of plate 16 is just visible in FIGURE 4 below the lower end of outer plate 14. Intermediate plate 16 includes a central elongated portion or tab 72 and two similar tabs 74 and 76 at its opposite end which are secured by suitable screws to respective ones of three spaced electrical insulators, two of which may be seen at 78 and 80 in FIGURE 5. These insulators are secured to panel 62 which latter panel is provided with a plurality of tank bolts 82 around its entire periphery for attachment to a suitable mounting flange which may be provided for this purpose.

Secured between outer plates 12 and 14 on opposite sides of intermediate plates 16 are a pair of spacer blocks 84 and 86 provided with suitable apertures receiving one end of a pair of return springs 88 and 90 as best seen in FIGURE 4. The opposite ends of return springs 88 and 90 are received in appropriate apertures 92 and 94 in the ends of slide bars 68 and 70. A U-shaped member 94 engages the outer surfaces of each of the outside plates 12 and 14, to press the outer plates against the intermediate spacer or pull blocks 84 and 86 and in conjunction with these blocks forms a spacing frame for the outer capacitor plates. Pull blocks 84 and 86 extend for a major portion of the length of the outer plates and are secured to these plates with the side edges of each of the blocks 84 and 86 in sliding engagement with the inside surfaces of slide bars 68 and 70. The extreme end of slide bar 86 at the upstream end of the capacitor 10 adjacent flanges 18 and 20 is visible in FIGURE 5.

Passing through support frames 64 and 66 are a pair of stub axles or pegs one of which is visible at 100 in FIGURE 4. Rotatably mounted on these stub axles are the legs 102 and 104 of lever arm 46 extending almost to the mounting panel. The pegs such as indicated at 100 correspond to the pivot 48, illustrated in FIGURE 3. The upwardly extending central rod portion of pivot arm 46 carries roller 62 while the lower end of this central rod bears against adjustable push bolt 44 threadedly received in the U-shaped frame member 98.

A pair of stub axles or pins one of which is indicated at 110 rotatably support a U-shaped drive element 112 which includes a right hand downwardly extending leg forming the cam arm 54 and a second downwardly extending portion forming a calibrator spring arm 114. Connected approximately midway of arms 54 and 114 to the square shaft 58 of U-shaped member 112 is the cam 56 which drives lever arm 46. Thermo sensitive cartridge 50 is mounted on panel 62 in conjunction with a suitable bracket 116 extending outwardly from the rear of support frames 64. Thermo sensitive cartridge 50 includes a movable plunger 119 which through arm 54 drives rotatably mounted U-shaped member 112 about the longitudinal axis defined by the pins, such as pin 110, secured in the support frames and passing through the central square shaft 58 of member 112.

If desired a suitable calibrating spring 118 may be provided which at one end is against the support panel 62 and at the opposite end acts through a spring frame 120 against calibrator arm 114. Suitable calibrating blocks such as block 122 may be inserted to space one end of calibrator spring 118, from calibrator frame 120.

As can be seen the present invention provides a novel variable capacitor and in combination with a dielectric liquid monitoring system particularly suited for use in monitoring the lubricating oil of diesel locomotives. The variable capacitor includes means for automatically compensating for variations in temperature of the lubricating liquid, the oil, or other dielectric liquid which results in no loss of accuracy or sensitivity of the measuring device. Through the use of suitable control and indicating equipment of conventional design, foreign material of all types may be detected in the diesel lubricating oil and appropriate signals given before any damage can occur. In normal operation foreign material has been found to build up slowly and uniformly and the device signals when this build up has reached a predetermined amount and it becomes necessary to change the lubricating oil.

It is preferable to provide additional control elements which serve to stop the diesel engine if certain foreign elements begin to increase or build up drastically in the oil. For example, in the case of water gaining access to lubricating oil, the foreign material content increases very rapidly and the engine immediately cuts off. It is therefore possible through use of the novel monitoring device of the present invention and the temperature compensated capacitor disclosed to not only show the quantity of dangerous material in the lubricating oil but to indirectly detect any trouble in the diesel engine at its very inception. This makes it possible to eliminate unnecessary overhauls and to avoid the necessity of arbitrary oil changes when they are in fact not needed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dielectric liquid monitoring device comprising a pair of spaced parallel conductive plates, a rigid frame supporting said plates for relative movement with respect to each other, temperature responsive means for sensing the temperature of a dielectric liquid flowing between said plates, and cam means actuated by said temperature responsive means and coupled to one of said plates for moving said one plate to vary the capacitance between said plates in accordance with the actuation of said temperature responsive means.

2. A monitoring device according to claim 1 wherein said one plate moves in a plane parallel to said other plate.

3. A dielectric liquid monitoring device comprising a pair of spaced outer parallel conductive plates electrically connected to form one side of a capacitor, a third plate intermediate said parallel plates and electrically connected to form the other side of said capacitor, a rigid frame supporting said plates, temperature responsive means for sensing the temperature of a dielectric liquid flowing between said outer plates, and cam means driven by said temperature responsive means for moving said outer plates parallel to said intermediate plate to vary the capacitance between opposite sides of said capacitor in response to variations of said temperature responsive means.

4. A dielectric liquid monitoring device comprising a pair of spaced outer parallel conductive plates electrically connected to form one side of a capacitor, a third plate intermediate said parallel plates and electrically connected to form the other side of said capacitor, a rigid frame supporting said plates for relative movement with respect to each other, temperature responsive means for sensing the temperature of a dielectric liquid flowing between said outer plates, a cam rotating in response to actuation of said temperature responsive means, and a lever intermediate said cam and said outer plates, said lever driving said plates in accordance with the contoured surface of said cam.

5. A monitor according to claim 4 wherein said cam is contoured to compensate for the temperature responsive changes in dielectric constant of a dielectric liquid passing between said outer plates.

6. A dielectric liquid monitoring device comprising a pair of spaced outer parallel conductive plates electrically connected to form one side of a capacitor, a third plate intermediate said parallel plates and electrically connected to form the other side of said capacitor, temperature responsive means for sensing the temperature of a dielectric liquid flowing between said outer plates, a cam arm actuated by movement of said temperature responsive means, said cam arm being connected to a rotatable shaft, a cam mounted on said shaft and rotating therewith, lever pivoted at one end and having a roller at its opposite end following the contour of said cam, said outer plates being mounted in a rigid capacitor frame and driven by said lever whereby said outer plates are translated parallel to said inner plate to vary the overlap between said outer and inner plates to compensate for temperature induced changes of the dielectric constant of a dielectric liquid flowing between said plates.

7. A monitor according to claim 6 wherein said temperature responsive means comprises a temperature actuated piston driving said cam arm.

8. A monitor according to claim 6 wherein said plates are attached to a mounting panel for insertion into the lubrication line of a diesel locomotive.

9. A monitor according to claim 8 wherein said capacitor forms part of a tuned transformer circuit, said circuit having its input coupled to a source of electrical energy and its output coupled to a meter.

10. A monitor according to claim 9 wherein said mounting panel is connected to a cabinet housing said electrical energy source and said meter, said cabinet being on the side of said panel opposite to said capacitor.

11. A monitor according to claim 10, wherein said outer plates includes outwardly extending flanges on one end for directing the flow of dielectric liquid between said plates.

12. A monitor according to claim 11 wherein said capacitor frame is biased against said lever by a pair of return springs.

13. A monitor according to claim 12 including a calibrating spring and adjusting means for adjusting the zero position of said cam arm.

14. A dielectric liquid monitor device comprising a pair of spaced outer parallel conductive plates electrically connected to form one side of a capacitor, a third plate intermediate said parallel plates and electrically connected to form the other side of said capacitor, a rigid frame supporting said plates, temperature responsive means for sensing the temperature of a dielectric liquid flowing between said outer plates, and means driven by said temperature responsive means for moving said outer plates parallel to said intermediate plate to vary the capacitance between opposite sides of said capacitor in response to variations of said temperature responsive means, said outer plates being mounted on said capacitor frame and said driven means comprising a pivoted lever for translating said outer plates along opposite sides of said intermediate plate to vary the area of overlap between said outer plates and said intermediate plate, said outer plates including outwardly extending flanges on one end for directing the flow of liquid between said outer plates.

References Cited in the file of this patent

UNITED STATES PATENTS

| | | |
|---|---|---|
| 1,616,622 | Horton | Feb. 8, 1927 |
| 2,241,057 | Clark | May 6, 1941 |
| 2,540,658 | De Giers et al. | Feb. 6, 1951 |
| 2,588,882 | Rolfson | Mar. 11, 1952 |
| 2,800,394 | Peters | July 23, 1957 |

FOREIGN PATENTS

| | | |
|---|---|---|
| 166,528 | Australia | Jan. 12, 1956 |